(No Model.)
T. A. WILLARD.
ELECTRODE FOR STORAGE OR OTHER BATTERIES.
No. 576,177. Patented Feb. 2, 1897.
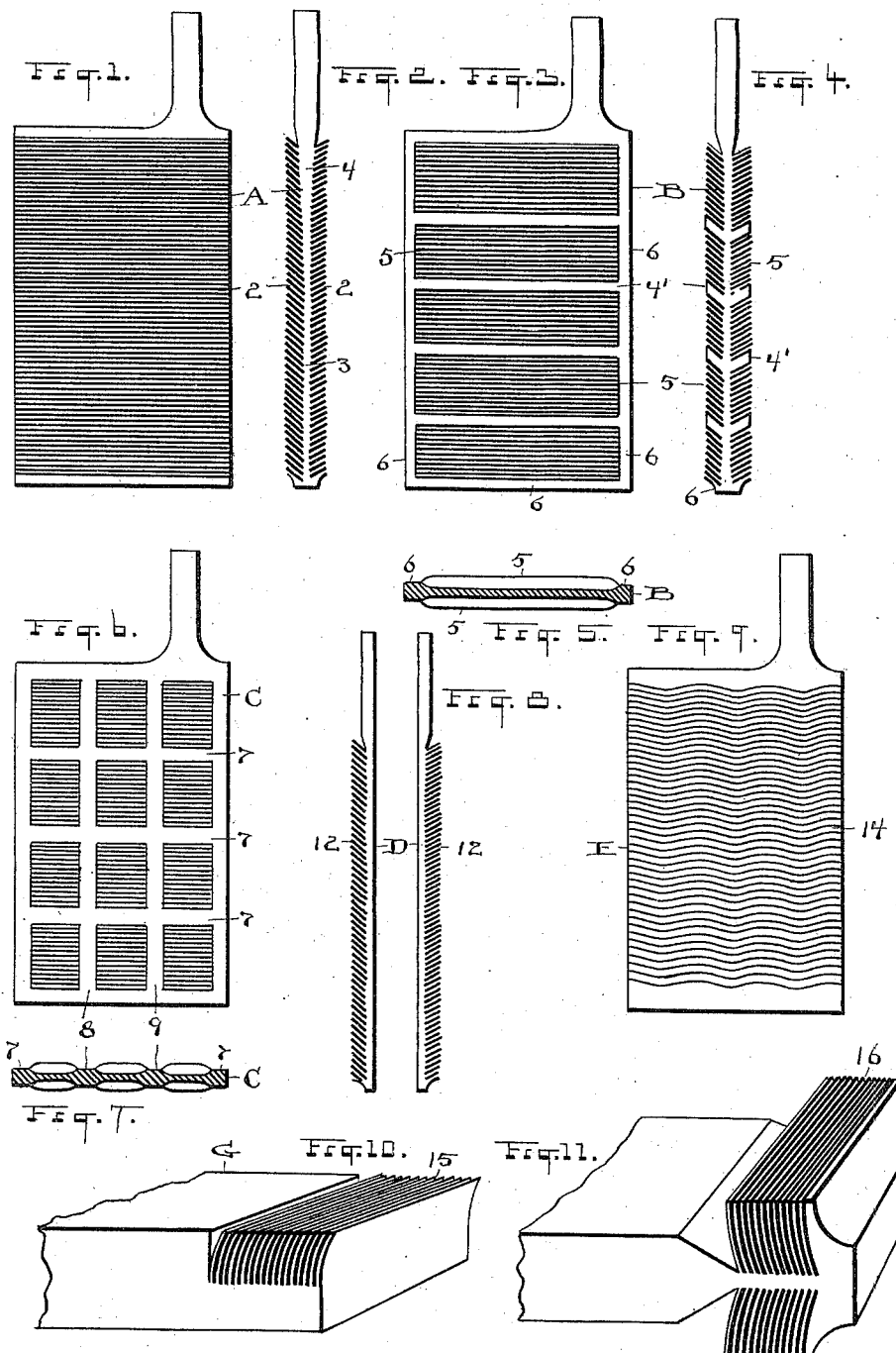
ATTEST.
R. B. Moser
F. C. McMillin
INVENTOR.
Theadore A. Willard
By H. J. Fisher ATTY.

UNITED STATES PATENT OFFICE.

THEADORE A. WILLARD, OF NORWALK, OHIO.

ELECTRODE FOR STORAGE OR OTHER BATTERIES.

SPECIFICATION forming part of Letters Patent No. 576,177, dated February 2, 1897.

Application filed November 7, 1895. Serial No. 568,177. (No model.)

*To all whom it may concern:*

Be it known that I, THEADORE A. WILLARD, a citizen of the United States, residing at Norwalk, in the county of Huron and State of Ohio, have invented certain new and useful Improvements in Electrodes for Storage or other Batteries; and I do hereby declare that the following is a full, clear, and exact description of the invention, which will enable others skilled in the art to which it appertains to make and use the same.

My invention relates to electrodes for storage and other batteries; and the invention consists in an electrode constructed substantially as shown and described, and particularly pointed out in the claims.

In the accompanying drawings, Figure 1 is a plain elevation, and Fig. 2 an edge view, of an electrode embodying my invention in one of many different forms that might be suggested and a number of which are shown in the drawings. In this form the core or body of the plate gradually deepens toward the top. Fig. 3 is a plain elevation and Fig. 4 an edge view, and Fig. 5 a cross-section, of a form of plate in which there are occasional transverse surface ribs adapted to form supports for the material above when for any reason said material has a tendency to shed off or drop. Fig. 6 is a plain elevation of a third form of electrode; and Fig. 7, a cross-section thereof, in which the surfaces are checkered like a grid, the ribs for supporting the active material and strengthening the plate running both vertically and transversely. Fig. 8 is a view of a modification in which two plates are used and adapted to be placed back to back, so as to form a single electrode. Fig. 9 is a plain elevation of an electrode in which the transverse shavings run in undulating lines from edge to edge of the plate. Fig. 10 is a perspective view of a plate in which the shavings or leaves are taken at right angles to the axis of the plate, and Fig. 11 is a perspective view of a plate in which the leaves or shavings are taken at about twenty-two and one-half degrees to a vertical axis.

Obviously a great many more modifications of the invention than those here shown might be suggested, but it is believed that the illustrations are sufficient both to disclose the character of the invention and the evidently wide scope thereof, a great many differentiations of the electrode being possible beyond those shown in these drawings.

One peculiar and novel feature of the invention is found in the fact that a plain flat sheet or plate of metal forms the basis out of which the complete electrode is made, and, further, in the fact that the portion of the plate which is used for storage purposes is converted into a series of shavings or leaves extending transversely thereof and upon both sides of the plate and to a depth which leaves only a comparatively slight yet sufficient central core or body to form a support for the electrode. All the several forms of electrode shown are substantially alike in these general characteristics, and this principle of construction is expected to run through all the modifications of the invention and is deemed essential thereto.

The plate used is preferably rolled lead, especially for storage-battery work, because, as is well known, lead is practically proof against the acids and constitutes an exceptionally good support for the active material. Furthermore, it is used here because it is readily converted into active material, especially in the present style of plate. However, any composition or alloy of metals that is known or that may be devised and which will serve the purpose can be used. So, also, may the electrode be used with any kind of battery where it is found available; but for the purposes of this application I will describe it in connection with a storage or secondary battery.

Now, referring to Figs. 1 and 2, we see an electrode A, embodying the invention in what may be considered one of its simplest forms. In these figures and upon both sides of the electrode are seen a series of very thin and very numerous leaves 2, running transversely of the plate from edge to edge and of equal depth of cut from the bottom to near the top, the place where the said leaves grow gradually of less depth, and thus having a gradually-deepening core or body portion 4, thus giving increased strength to the body near its top, where it is most liable to weakening by electrical action.

Each and all the leaves 2 are usually made as thin as very thin paper and are produced by means of a suitable sharp instrument adapted to shave the metal down into the leaves 2, as shown, without curling or breaking them. The said leaves 2 therefore are mere shavings of greater or less thickness, and of course become quite dense and crowded even though they be thrown outward and downward away from the cut surface, more or less, as shown. Of course the farther they are thrown out the more room they afford between them; but they also thereby afford room for expansion during the process of conversion and forming of the material, which is very desirable. Then again this brings the said leaves well out from the core or body 3 in position, where they will be acted on by the current most readily and converted while the body portion 3 remains unaffected. There is also the further and very important advantage in a plate having shavings, as described, in that it can be formed by the action of the current as quickly and easily as the ordinary paste-plate. The shavings lying, as they do, practically one upon the other and yet separated disclose a vast surface to the current, and being very thin it will be seen that their conversion must be very rapid as well as very complete.

It will also be noticed as a feature peculiar to this electrode that none of the material of the plate is removed, as occurs, for example, when channels are sawed into a plate. All the cut-away material is put to use and all the shavings are uniformly alike and a part of the parent stock with core 3 left at its center. This makes a homogeneous element in which all parts thereof are of the same stock and nature and have natural connections, a condition that cannot exist when the active material is applied and is of a different nature from its support.

The remaining figures are presented here as modifications of the plate or electrode shown in Figs. 1 and 2. Thus in Figs. 3, 4, and 5 I show a plate B with transverse ribs or supports 4', which are left standing between the shavings 5, and a border 6 is left standing all around the plate. The said ribs 4' give support to the active material above them and the border 5 helps to strengthen the plate.

In Figs. 6 and 7 the plate C has the principle of construction shown in Figs. 3, 4, and 5 extended into the fashion of a grid, having transverse supporting-bars 7 and vertical strengthening-bars 8 and border 9. Obviously still different styles of gridded plates could be suggested, and I might even fill the interstices or spaces between the leaves in nearly all forms of my plate with applied material, if I preferred; but this is not the preferred nor the better way.

In Fig. 8 I show two separate plates D, intended to be brought together back to back and having each its outer surface 12 shaved, as in the other figures.

Fig. 9 shows a plate E, having the leaves or shavings 14 running from edge to edge of the plate in undulating or wavy lines, which are so formed while the cutting or shaving occurs.

In Fig. 10 is shown a plate G, in which the shavings 15 are taken at right angles to the axis of the plate. To cut the shavings at this angle would leave little room for them and make the mass too dense for good service, and hence some of the shavings would have to be removed. A better form therefore appears in Fig. 11, where the shavings 16 are taken at an inclination of about twenty-two and one-half degrees, and there is room for all of them, as they are bent down to a substantially horizontal plane.

In all the forms of plate shown, as well as in those contemplated, the shaving of their surfaces can be done mechanically, and hence they can be made cheaply and rapidly. I have described all the plates as having very thin leaves, and in some instances they are made as thin as tissue-paper, according to the use that is to be made of them. If desired, a plate of this kind can be made with a frame of inoxidizable material for its support. In that case exceptionally thin shavings can be advantageously used.

It will be noticed in all the figures except Fig. 9 that when the surface of the plate is subdivided into a series of leaves or shavings, as shown, and turned from their original relation outward it produces a plate much wider than the plate itself was before the surfaces thereof were raised into leaves, as shown.

Of course each leaf is shaved down separately, and one is made after the other in quick succession by any means that may serve the purpose.

It will be noticed as a distinguishing and novel feature of my electrode that the leaves in all cases are of equal thickness from start to finish. That is, they are just as thick or heavy at the point where the tool is set into the stock as at the base, where they connect with the stock. In this respect the said leaves or shavings are like the leaves of a book, one exactly like the other and uniform in cross-section from edge to base and with smooth even surfaces. Now the advantage of this construction is that all the leaves and all portions thereof must form evenly and there is no surface-shedding, as would occur if the surfaces of the leaves were roughened or covered with slight projections, and there is equal space at all points between the leaves.

The subject-matter, broadly, of an electrode with shaved leaves of uniform cross-section their full depth is divided out of this case and made the subject-matter of an application filed August 26, 1896, Serial No. 603,944.

By making the leaves undulating or wavy from side to side of the electrode, as shown in Fig. 9 and above described, active material is more perfectly secured when it forms than it would be with a plain plate. In the process of forming the cell a very powerful ampere current is employed, and this produces a large amount of gas, which forms at the point of junction between the plate and the upright support at its center. Experience has shown that there is a tendency in plates thus constructed and formed for the active material to separate itself from its support and slide off, but by making the leaves undulating this tendency is overcome. These undulations run laterally and extend the full depth of the leaf and are imparted when the leaf is made.

What I claim is—

1. The electrode described having a series of shaved leaves of uniform thickness from edge to base and formed in undulating lines the full depth of the leaf, whereby the active material is confined, substantially as described.

2. A plate for batteries having its sides shaved into thin leaves and a central supporting portion increasing in thickness toward the top thereof, substantially as described.

Witness my hand to the foregoing specification this 25th day of October, 1895.

THEADORE A. WILLARD.

Witnesses:
GEORGE RING,
WM. H. HUSTED.